United States Patent [19]
Mollura

[11] 3,753,819
[45] Aug. 21, 1973

[54] METHOD OF MAKING TUBULAR FLEXIBLE BAG WITH LAP WELDED ENDS

[76] Inventor: Carlos A. Mollura, 2824 Del Oro Ln., Fullerton, Calif. 92632

[22] Filed: Aug. 9, 1971

[21] Appl. No.: 170,209

[52] U.S. Cl............ 156/69, 156/202, 156/203, 156/204, 156/218, 156/227, 156/273, 156/304, 156/306, 229/48 T, 93/59
[51] Int. Cl.............. B29d 23/10, B29c/27/06
[58] Field of Search.................... 156/227, 156/228, 216, 204, 203, 191, 69, 54, 273, 304, 306, 226, 218, 198, 213; 264/320, 322, 334, DIG. 64, DIG. 66; 229/48 T; 93/59, 12, 27

[56] References Cited
UNITED STATES PATENTS

| | | | |
|---|---|---|---|
| 2,645,591 | 7/1953 | Makrauer | 156/227 X |
| 2,440,664 | 4/1948 | Irons | 156/218 X |
| 2,584,632 | 2/1952 | Southwick, Jr. | 229/48 T |
| 3,619,863 | 11/1971 | Ciabani | 264/320 X |
| 3,362,302 | 1/1968 | Friedman | 229/48 T |

*Primary Examiner*—Alfred L. Leavitt
*Assistant Examiner*—Basil J. Lewris
*Attorney*—Flam and Flam

[57] ABSTRACT

A length of plastic material is rolled to form a tube, the ends being lapped and partially welded to leave an access opening to the inside of the bag. The bag is then telescoped over welding die or form having the general configuration of the tube, but axially compressed. The tube is then accordion folded about the thin form so that the ends of the tube can be wrapped around peripheral rims of the form. End pieces are then welded in place, the form is removed through the access opening and the partially welded lap joint forming the access opening is sealed.

8 Claims, 11 Drawing Figures

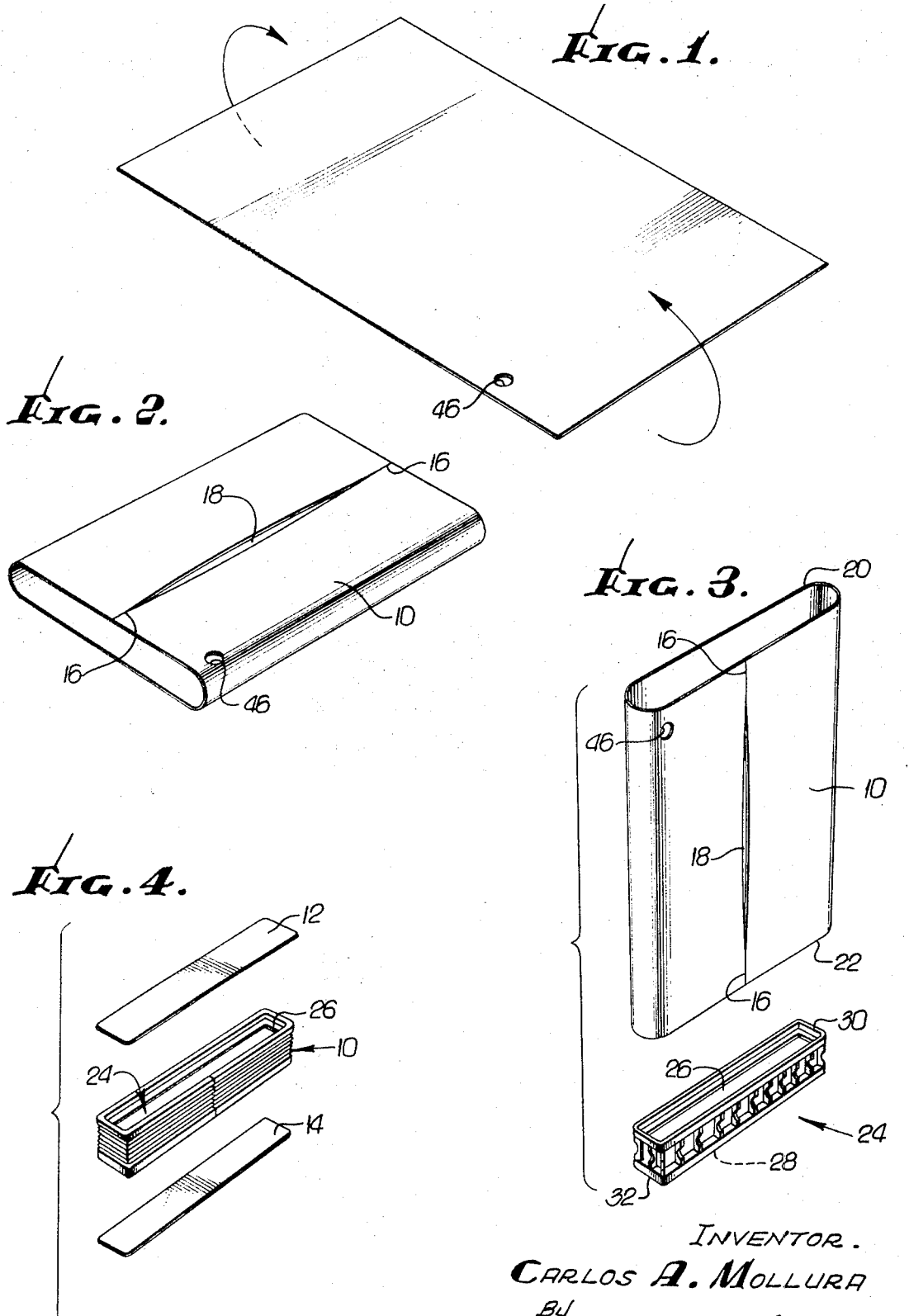

PATENTED AUG 21 1973 3,753,819

INVENTOR.
CARLOS A. MOLLURA
BY Flam and Flam
ATTORNEYS.

METHOD OF MAKING TUBULAR FLEXIBLE BAG WITH LAP WELDED ENDS

BACKGROUND OF THE INVENTION a. Field of the Invention

This invention relates to fabrication of plastic sheet material and, particularly, to the fabrication of bags usable, for example, as water mattresses.

b. Discussion of Prior Art

The easiest method of making a water mattress is to juxtapose two identical layers of plastic material and butt weld the edges together by solvent, adhesive or heat. When such a bag is filled with water, the corners move out of square. The resulting bag lacks a neat appearance. If the bag is inserted in a rectangular frame, a tight fit at the corners is impossible. Moreover, fluid forces tend to open the butt weld.

Another known method for making a bag is to form it as a rectangular parallelpiped, with the corners folded substantially the same way as a box is gift wrapped with paper. A neatly formed bag results. But a weld at three and more juxtaposed layers is not reliable.

The ideal arrangement is one in which a rectangular prism has its ends turned inwardly rather than outwardly for placement of rectangular end pieces over them. A lap weld, rather than a butt weld, is thus provided with only two layers being welded together. A strong reliable seal is provided and a square corner results. The problem is how, in an uncomplicated way, such a bag structure can be made. The primary object of this invention is thus to provide a simple method for making a plastic bag with lap welded ends.

BRIEF SUMMARY OF THE INVENTION

In order to accomplish the foregoing object, a length of plastic material is looped to form a tube. The overlapped ends are welded along a line parallel to the tube axis, but an opening is provided in the middle of the weld for access to the inside of the bag. The bag is then telescoped over a floating die having a peripheral configuration corresponding to the desired cross-section of the tube. However, the axial length of the die does not correspond to the length of the tube; instead, the die is relatively thin. The sides of the tube are accordion folded over the thin die. The die has rims about which the ends of the tube are inwardly folded and held. End pieces are placed over the folded tube ends, and the entire assembly is sandwiched between electrodes of a dielectric welding machine. Two dielectric gaps are serially connected by the floating die, which is electrically conductive. The die is removed through the access opening after the lap welds are formed at the ends. An insulation strip is inserted into the bag to underlie the incompleted axial weld. The axial weld is completed, trapping the insulation strip inside. Finally, the strip is removed through the filler plug opening.

BRIEF DESCRIPTION OF THE DRAWINGS

A detailed description of the invention will be made with reference to the accompanying drawings. These drawings, unless described as diagrammatic or unless otherwise indicated, are to scale.

FIGS. 1 and 2 are diagrammatic views illustrating how a flat sheet of plastic material (FIG. 1) is looped and partially welded (FIG. 2) to form a tube.

FIGS. 3, 4 and 5 are diagrammatic views illustrating the insertion of a welding die or form into the plastic tube (FIG. 3); the accordion folding of the tube about the die; the inwardly folding of the edges of the tube ends over the top and bottom rims of the die and the placement of plastic end pieces over the die ends (FIG. 4); and the welding of the end pieces.

DETAILED DESCRIPTION

The following detailed description is of the best presently contemplated mode of carrying out the invention. This description is not to be taken in a limiting sense, but is made merely for the purpose of illustrating the general principles of the invention since the scope of the invention is best defined by the appended claims.

Figure 11:
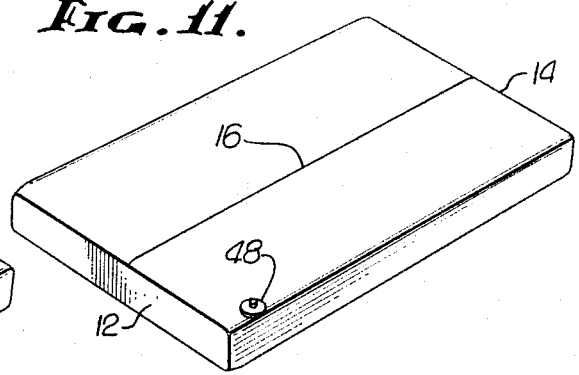

The completed bag shown in FIG. 11 is made from three sheet plastic parts, tube 10, and two end pieces 12 and 14 closing the ends of the tube. These sheet plastic parts are welded together by heat, generated in this instance dielectrically by application of a high frequency electrical field in the region of the plastic intended to be heated and welded. Polyvinyl chloride materials are well known plastics used for such purposes.

The two end pieces are rectangular whereby the entire bag takes on the configuration of a rectangular parallelepiped for use of the bag as a water mattress. All of the welds are lap welds so that the internal fluid pressure is resisted by stressing the weld in shear across its entire transverse width. Such lap welds are extremely strong as compared with butt welds in which internal pressure tends progressively to separate the abutted welded layers. There are only three lap welds.

The first lap weld 16 (FIG.2) joins the ends of a sheet of plastic material (FIG. 1). The weld 16 at first is only partly completed, leaving a central gap or opening 18 for purposes to appear hereinafter.

Figure 6:
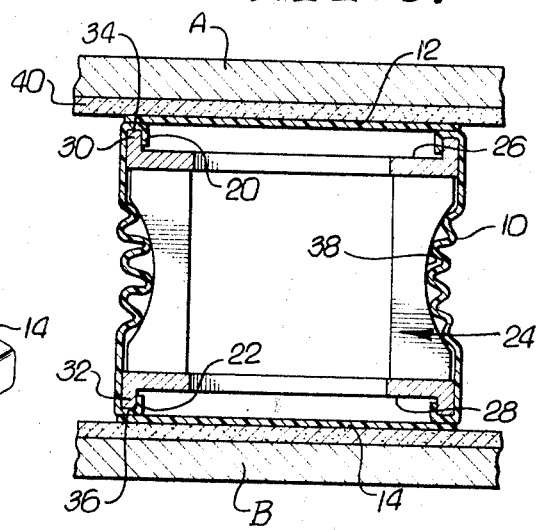
FIG. 6 is a fragmentary transverse sectional view illustrating the welding die and plastic components sandwiched between plates of a dielectric welding machine.
Figure 8:
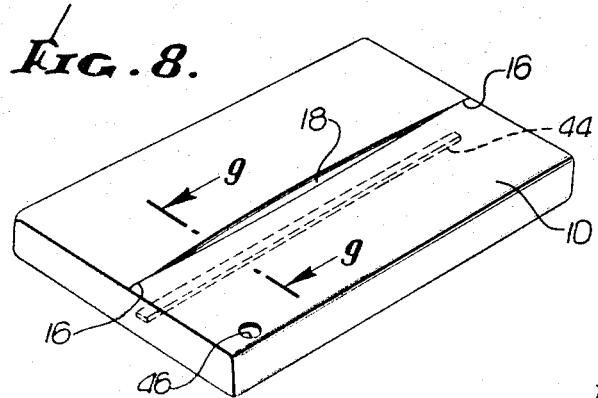
FIGS. 8, 9, 10 and 11 are diagrammatic views illustrating the placement of a separator strip beneath the lap weld of the tube preparatory of completion of the lap weld (FIG. 8); the completion of the lap weld (FIG. 9); the removal of the separator strip (FIG. 10); and the attachment of a valve or connector body to the tube.

The tube 10 is prepared for lap welding the end pieces 12 and 14 to the free edges 20 and 22 at the ends of the tube 10. For this purpose, the tube 10 is telescoped over a floating die 24. The die has top and bottom shallow recesses 26 and 28 (see also FIG. 6) that form thin rims 30 and 32. The peripheral portions of each rim has the configuration of intended cross-section of the completed mattress and the precise configuration of the end pieces 12 and 14.

The distance between the end surfaces 34 and 36 of the die rims is substantially less than the intended axial length of the tube 10. The end edges 20 and 22 of the tube are, respectively, wrapped inwardly around the rims 30 and 32. In order to make this possible, the central portion of the tube 10 is generally accordion folded or gathered. The sides of the die between the rims are relieved as at 38 so that the folds are easily accommodated.

The inwardly wrapped edges 20 and 22 are held on the inside of the rims about peripheral walls of the recesses 26 and 28 by the aid of clamps (not shown) or boards (not shown) press fitted into the recesses 26 and 28. The end pieces 12 and 14 may now be positioned on the rims in overlapped relationship to the tube edges 20 and 22 and as indicated in FIG. 4.

The plastic parts so preassembled are sandwiched between two plates A and B of a dielectric heating machine. The top plate may be the high voltage electrode and the lower plate may be at ground potential. A closing pressure is applied between the plates, bringing the end pieces 12 and 14 into firm contact with the end edges 20 and 22 of the tube 10.

The die 24, being made of aluminum or other electrically conductive material, forms a capacitor with the upper plate A. The overlapped plastic material at the end surface 34 of the rim 30 forms part of the dielectric of this capacitor. The remaining part of the capacitor dielectric is formed by a heat stable dielectric pad 40 of designed thickness. The die 24 similarly forms a capacitor with the lower plate B. The overlapped plastic material at the end surface 36 of the rim 32 forms part of the dielectric of this capacitor. The upper and lower capacitors are electrically in series and the voltage is divided equally between them. Upon the application of a suitable high frequency a.c. electrical potential across the plates A and B, heat is generated in the dielectric material and heat welds are formed. The floating die 24 also equalizes the mechanical pressure at the top and bottom layers as the plates A and B close.

In practice, the end pieces 12 and 14 are oversize in order to permit preassembly of plastic parts with the die 24 without unnecessary attention to alignment. The peripheral portion of the end pieces readily tear away after the weld is formed.

Figure 5:
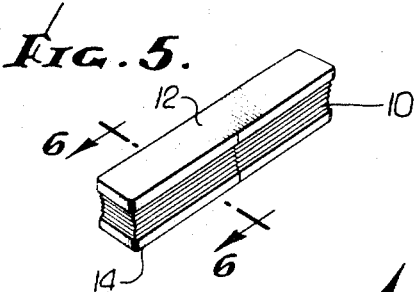
Figure 7:
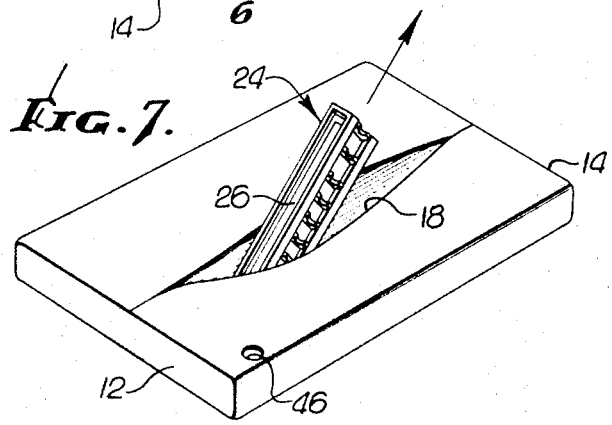
FIG. 7 is a diagrammatic view illustrating how the die is removed from the bag.

The die 24 is now removed through the gap 18 (FIG. 7). The length of the tube 10 exceeds the width of the tube allowing the die to be turned preparatory to removal. Clamps or other devices used to hold the inwardly turned edges pull free from the bag and are removed through interior access openings in the die.

Figure 9:
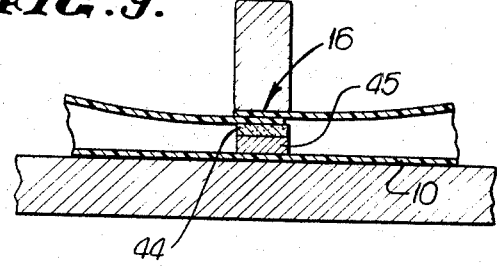

The lap weld 16 for the tube part 10 is now completed. In order to complete the lap weld, a heat stable flexible dielectric separator 44 is inserted inside the mattress beneath the area where the weld is to be completed so that the weld does not include the side of the tube opposite the weld 16. The separator is adhered to one side of a flexible metal strip 45 that operates like the die 24 in forming capacitors for dielectric heating. The mattress with the inserted separator 44 is now dielectrically heat welded as indicated in FIG. 9.

Figure 10:
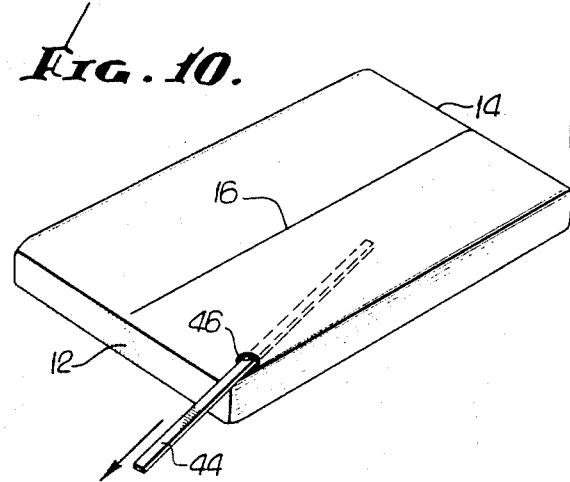

The separator 44 is now removed through a fill hole 46 (FIG. 10). This hole was formed in the plastic sheet 10 (FIG. 1) before the sheet was formed into a tube. The mattress is completed by attaching a valve body or connector body 48 at the fill hole 46. If the body 48 has an adequate opening, it can be attached at an earlier stage in the process.

The three lap welds are simple and thus capable of being securely formed by well known dielectric heat welding processes. Since the die 24 floats between two plates A and B, it requires no supporting arm that would have to extend through the access opening 18. Such a supporting arm would unduly complicate the placement of the plastic about the die. By use of the floating die, the quick and economical preassembly of all of the plastic parts preparatory to simultaneous welding is possible. The lap welds provide a strong structure, and the corners are perfectly formed neatly and properly to fit into a rectangular frame.

Intending to claim all novel, useful and unobvious features shown or described,

I claim:

1. The process of making a lap welded substantially closed bag which includes the following steps:
   a. forming a tube by lap welding the ends of a sheet of material, but leaving a lateral gap intermediate the ends of the lap weld so formed;
   b. telescoping the tube over a die having rims at opposite ends spaced from each other substantially less than the designed length of the tube;
   c. placing the end edges of the tube respectively adjacent the rims while gathering the central portion of the tube;
   d. inwardly folding the edges of the tube over the rims;
   e. placing end members over the inwardly folded edges of the tube;
   f. adhering the end members to the folded edges;
   g. removing the die from the tube through the gap; and
   h. finally completing the lap weld by closing the gap.

2. The process of making a bag in accordance with the process of claim 1 in which the end members are adhered to the folded edges by the step of heat welding.

3. The process of making a bag in accordance with the process of claim 1 in which the end members are adhered to the folded edges by the steps of sandwiching the tube, end members and die between the plates of a dielectric heating machine; applying an a.c. current between said plates while the die serves as a circuit element electrically connecting corresponding plates of two serial capacitors located respectively at the said rims of said die.

4. The process as set forth in claim 1 including the step of completing the lap weld by first inserting a separator into the bag and between the lap weld and the opposite bag side, then applying or generating heat at the region of said lap weld to complete the same, and thereafter removing said separator through a filler hole of said bag.

5. The process as set forth in claim 1 together with the step of releasably clamping the marginal portions of the inwardly folded edges of the tube to the inside of said rims.

6. The process of making a lap welded bag in the form of a tube of uniform cross-sectional configuration which includes the following steps:
   a. forming a tube by lap welding the ends of a sheet of material, but leaving a lateral gap intermediate the ends of the lap weld so formed;
   b. telescoping the tube over a die having rims at opposite ends spaced from each other substantially less than the designed length of the tube and with the rims corresponding to the designed cross-sectional configuration of the bag;
   c. placing the end edges of the tube respectively adjacent the rims while gathering the central portion of the tube together to fall at a relieved intermediate portion of the rim;
   d. inwardly folding the edges of the tube over the rims;

e. placing end members over the inwardly folded edges of the tube;

f. simultaneously adhering the end members to the folded edges by closing plates of a heating machine over the assembled die, tube and end members;

g. removing the die from the tube through the gap; and h. finally completing the lap weld by closing the gap.

7. The process as set forth in claim 6 including the step of completing the lap weld by first inserting a separator into the bag and between the lap weld and the opposite bag side, then applying or generating heat at the region of said lap weld to complete the same, and thereafter removing said separator through a separate filler hole of said bag.

8. The process as set forth in claim 6 together with the step of releasably clamping the margnal portions of the inwardly folded edges of the tube to the inside of said rims.

* * * * *